(12) United States Patent
Haukaas

(10) Patent No.: US 6,840,729 B2
(45) Date of Patent: Jan. 11, 2005

(54) ROUND BALE TRANSPORTER

(75) Inventor: Duane Haukaas, Saskatchewan (CA)

(73) Assignee: Haukaas Manufacturing Limited, Saskatchewan (CA)

( * ) Notice: Subject to any disclaimer, the term of this patent is extended or adjusted under 35 U.S.C. 154(b) by 120 days.

(21) Appl. No.: 10/407,903

(22) Filed: Apr. 7, 2003

(65) Prior Publication Data
US 2004/0197167 A1 Oct. 7, 2004

(51) Int. Cl.[7] .................................................. B60P 1/16
(52) U.S. Cl. ........................ 414/24.5; 298/18; 414/111; 414/468; 414/470; 414/552
(58) Field of Search .......................... 298/18; 414/24.5, 414/24.6, 111, 468, 469, 470, 546, 551, 552

(56) References Cited

U.S. PATENT DOCUMENTS

| | | | | |
|---|---|---|---|---|
| 3,922,036 A | * | 11/1975 | Kalsbeck et al. ............. | 298/18 |
| 4,500,242 A | * | 2/1985 | Beikman .................... | 414/24.5 |
| 5,071,304 A | * | 12/1991 | Godfrey ..................... | 414/111 |
| 5,076,752 A | * | 12/1991 | Rader ......................... | 414/470 |
| 5,249,903 A | * | 10/1993 | Green et al. ............... | 414/24.5 |
| 6,000,899 A | * | 12/1999 | Lowe ......................... | 414/111 |
| 6,019,562 A | * | 2/2000 | Cheatham .................. | 414/111 |
| 6,152,536 A | * | 11/2000 | Krinhop ..................... | 298/18 |

* cited by examiner

Primary Examiner—Janice L. Krizek
(74) Attorney, Agent, or Firm—Adrian d. Battison; Michael R. Williams; Ryan W. Dupuis

(57) ABSTRACT

A trailer for transporting round bales has two bale support cradles one on each side and pivotal about an axis along the side between a first lifting position in which the cradle extends outwardly and a second transport position in which the cradle is located on the support area for transport on the frame. Each cradle has bale support rails carried on polygonal axially spaced rings defining a cylindrical chamber so that a bale can be lifted by rails on each side from the ground rotated onto the frame for transport and rotated back to its initial position with its flat spot back on the ground. A backstop member can be moved from a first position closing the rear end to allow the bales to be discharged from the rear end by forward movement of the trailer.

17 Claims, 3 Drawing Sheets

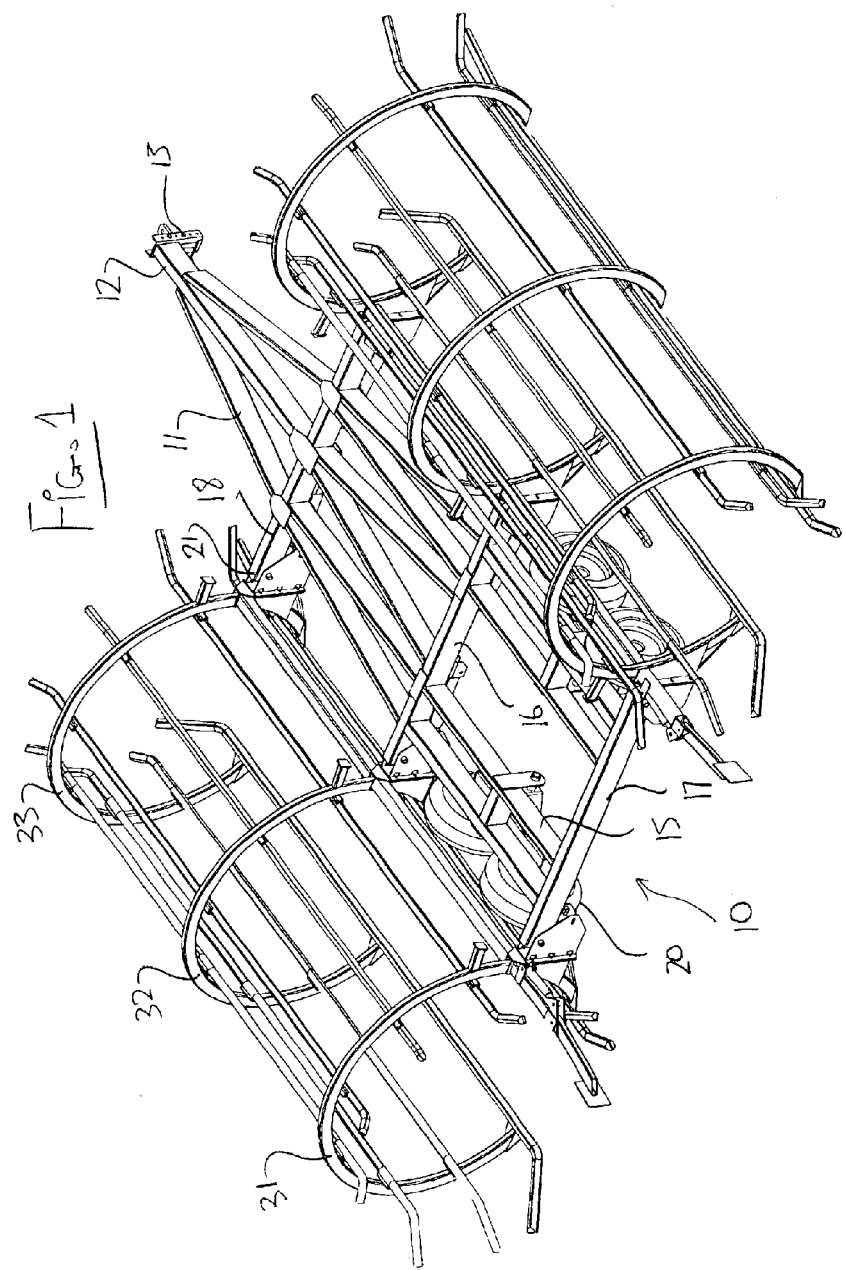

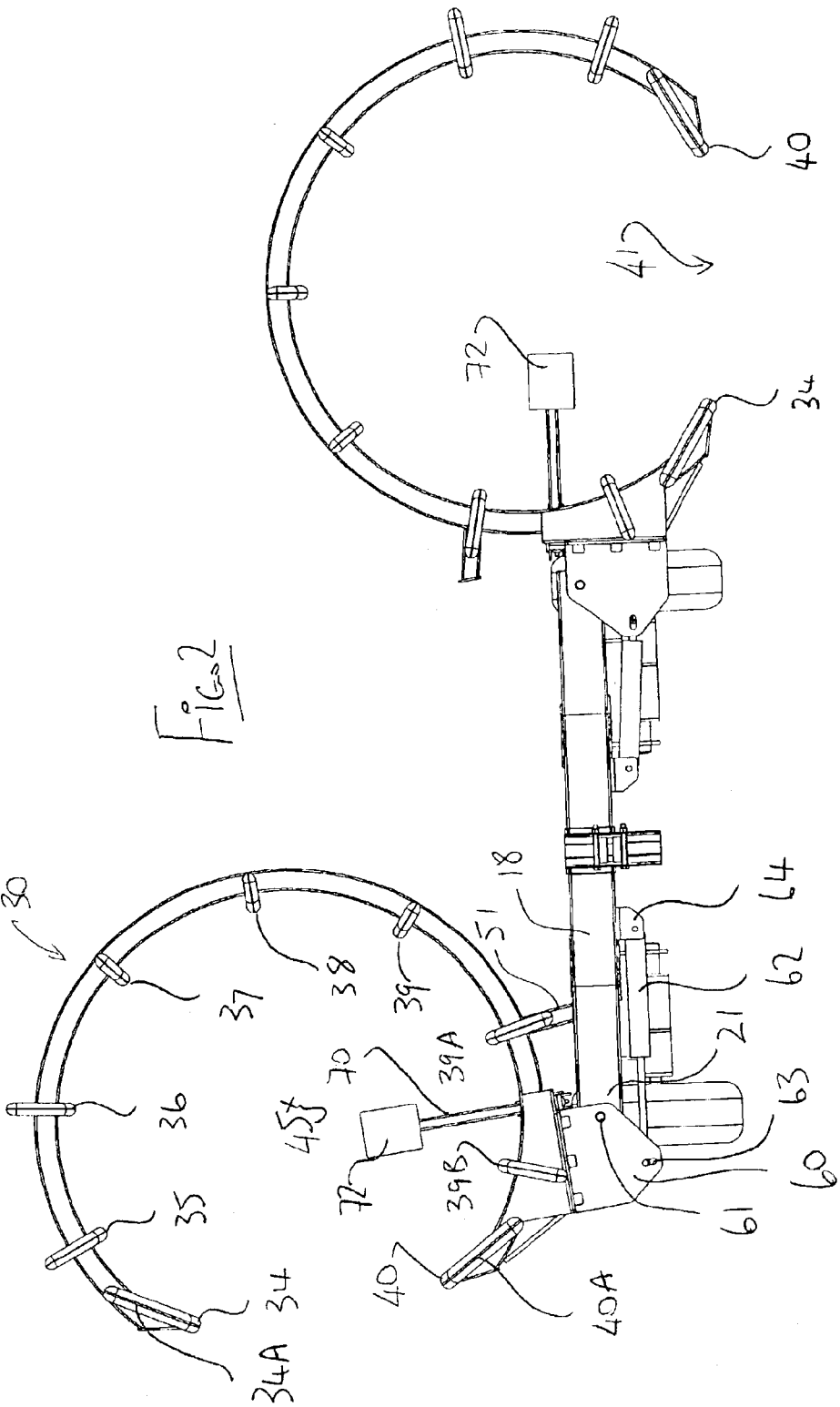

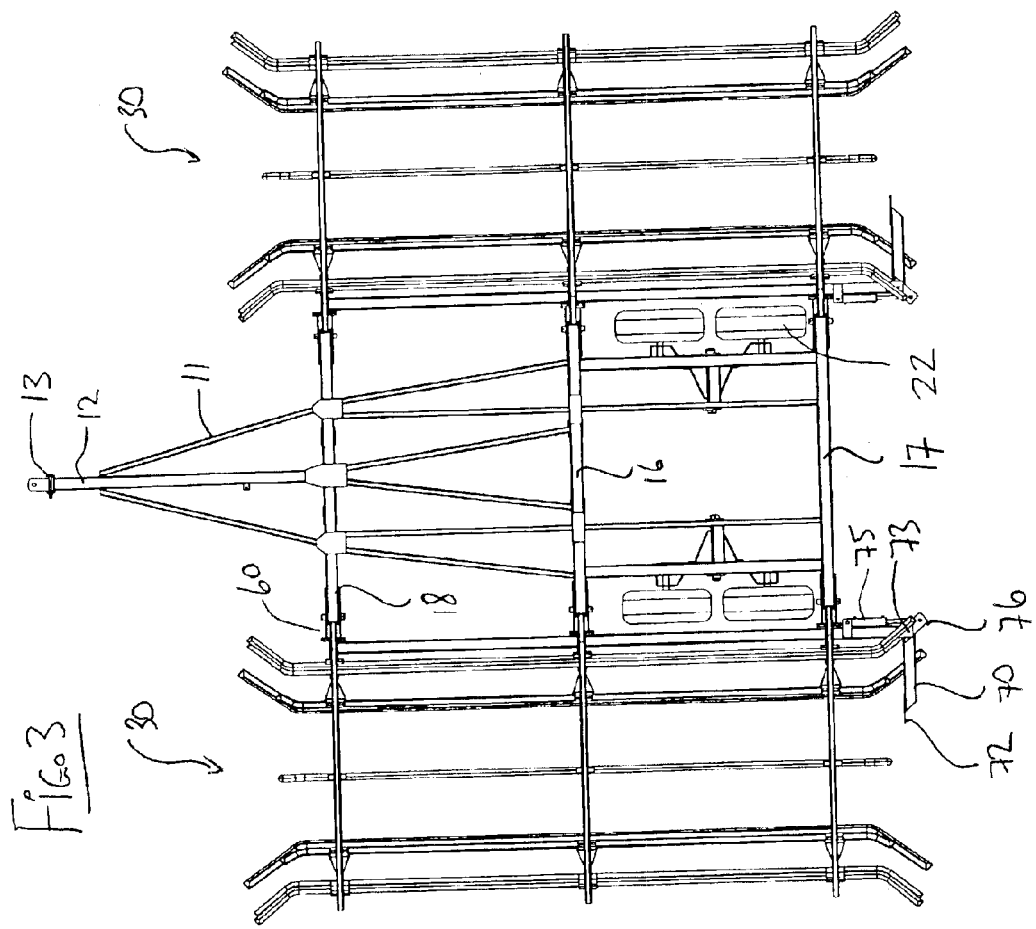

ROUND BALE TRANSPORTER

BACKGROUND OF THE INVENTION

Round bales after formation by the baler are left in the field for later collection for storage or for long distance transportation. Where the bales are intended to be transported over long distances, they are loaded onto a fifth wheel trailer which can be towed by a highway tractor. The bales are generally loaded onto the trailer by a front end loader which uses a fork lift system at the forward end for lifting each bale individually into position on the trailer. It is convenient therefore that all of the bales be brought to a road side location for loading quickly and conveniently from that road side location onto the trailer.

At this time there are basically two systems for transporting bales including firstly the front end loader on the tractor itself so that in many cases the tractor is used to lift each bale in turn and to transport it from the field location to the roadside location. This is of course inconvenient and inefficient since many bales may be transported over as much as half a mile which is wasteful in terms of machinery usage, operator hours and fuel.

However larger bale transport trailers are generally designed to carry up to twenty bales arranged in two rows. Various different designs of trailer are arranged of this type in many cases providing chain conveyors onto which the bales are loaded so that the bales can be discharged rearwardly from the trailer into rows. This type of trailer is relatively complicated including necessity for relatively expensive chain constructions and the drives for those chains thus leading to a relatively expensive cost for the trailer. Such trailers are therefore used for medium distance transportation where the cost of the trailer can be justified and therefore is of little assistance in regard to the relatively short distance transportation from the field to the road location.

Other relatively inexpensive trailers are available where the bales are loaded onto cradles carried on the trailer but then are discharged by tilting the cradles outwardly so that the bales simple role to the ground on each side of the trailer. This construction has the significant disadvantage that the bales are rotated from their initial ground position when first formed so that a different angular orientation is provided relative to the ground when unloaded from the trailer. This means the original flat spot of the bale is rotated and the bale now sits on another part of its periphery on the ground. This rotation significantly affects the weathering properties of the bale. It is much preferred therefore that a bale once initially formed in one orientation and having generated a flat spot at that orientation is, when transported, returned to that orientation for further storage.

A trailer for transporting bales conveniently over relatively short distances and maintaining the bale in its original flat spot orientation is thus desirable to provide enhanced efficiency relative to the conventional front end loader technique commonly used in such short distance transportation.

SUMMARY OF THE INVENTION

It is one object of the invention to provide an improved transporter for cylindrical bales.

According to one aspect of the invention there is provided an apparatus for transporting round bales comprising:

a transporter frame mounted on ground wheels for movement across the ground;

the frame having two sides defining therebetween a support area;

two bale support cradles, each mounted at a respective one of the sides;

each support cradle being pivotal about an axis along the respective side between a first lifting position in which the cradle extends outwardly from the respective side and a second transport position in which the cradle is located on the support area for transport on the frame;

each cradle having bale support surfaces defining a cylindrical chamber within which a plurality of bales can be supported coaxially end to end with the axes of the bales extending longitudinally along the cradle;

the support surfaces being arranged such that a bale in the chamber is lifted and rotated, by movement of the cradle from the first position to the second position, from a position alongside the frame at an initial angular orientation relative to the ground to a transport position on the frame and is returned to the position alongside the frame at the same initial orientation relative to the ground, by movement of the cradle from the second position to the first position;

each cradle having two bale lifting surfaces extending longitudinally along the cradle and transversely spaced across the cradle;

the bale lifting surfaces being arranged such that forward longitudinal movement of the cradle in a direction axially of a bale resting on the ground acts to move the bale lifting surfaces axially of the bale to a position where each lies on a respective side of a center line of the bale;

the bale lifting surfaces being arranged and spaced by a distance less than the diameter of the bale such that the bale lifting surfaces extend underneath that part of the bale which is spaced from the ground for lifting the bale from the ground and returning the bale to the ground.

Preferably the bale lifting surfaces comprise a pair of parallel rails with outwardly diverging front end portions.

Preferably each cradle is arranged to support at least three bales.

Preferably the bale supporting surfaces comprise a plurality of parallel rails supported at the surface of an imaginary cylinder surrounding the bale by a plurality of generally annular members at spaced positions along the cradle.

Preferably each annular member comprises a roll-formed hoop.

Preferably an inner part of the annular member includes a leg member so as to rest on the frame when moved to the transport position.

Preferably an inner part of the annular member is pivotally connected to the frame side by a bracket defining a pivot axis inwardly of the inner part and located along the frame side.

Preferably the bracket is pivotal by a hydraulic cylinder connected to the bracket underneath the frame.

According to a second aspect of the invention there is provided an apparatus for transporting round bales comprising:

a transporter frame mounted on ground wheels for movement across the ground;

the frame having two sides defining therebetween a support area;

two bale support cradles, each mounted at a respective one of the sides;

each support cradle being pivotal about an axis along the respective side between a first lifting position in which the cradle extends outwardly from the respective side and a second transport position in which the cradle is located on the support area for transport on the frame;

each cradle having bale support surfaces defining a cylindrical chamber within which a plurality of bales can be supported coaxially end to end with the axes of the bales extending longitudinally along the cradle;

the support surfaces being arranged such that a bale in the chamber is lifted and rotated, by movement of the cradle from the first position to the second position, from a position alongside the frame at an initial angular orientation relative to the ground to a transport position on the frame and is returned to the position alongside the frame at the same initial orientation relative to the ground, by movement of the cradle from the second position to the first position;

each cradle having two bale lifting surfaces extending longitudinally along the cradle and transversely spaced across the cradle;

the bale lifting surfaces being arranged such that forward longitudinal movement of the cradle in a direction axially of a bale resting on the ground acts to move the bale lifting surfaces axially of the bale to a position where each lies on a respective side of a center line of the bale;

the bale lifting surfaces being arranged and spaced by a distance less than the diameter of the bale such that the bale lifting surfaces extend underneath that part of the bale which is spaced from the ground for lifting the bale from the ground and returning the bale to the ground;

wherein each cradle is open at least at its front end so as to allow a bale to be picked up into its front end and slid into the cradle by forward movement of the frame;

and wherein each cradle has a stop member for preventing rearward movement of a bale beyond a rear end of the cradle.

In one arrangement the stop member is movable from an operating position closing the rear end to a retracted position in which the rear end is open allowing the bale to be discharged from the rear end. In this way the bales can be discharged by opening the stop member and continuing forward movement, or by backing up and releasing the bales through the open front. The stop member can also be fixed which requires therefore discharge through the open front. A fixed stop member may just be a beam across the rear of the cradle. The stop member can be located at the side and engages the rear bale from the side provided it prevents rearward movement beyond a rear end of the cradle.

The bale transporter described herein has the following advantages:

1. It is very quick and manoeuvrable in the field.
2. When the bales are picked, the bottom of the bale that is the flat spot stays to the bottom when unloaded. The benefit of this is that only one are of the bale will become spoiled by the ground contact. Conventional transporters generally rotate the bales when loading and unloading causing the bale to be placed on a different area of the bale. Another benefit to the flat spot being on the bottom is that when the bale is placed on the fifth wheel trailer for a long haul transportation, the bail will load and stack better on the trailer as the flat spot will be on the trailer.
3. The transporter can be used to transport bales from field to yard. However the primary intention of the transporter is that it is used for accumulating the bales in the field at a suitable location generally at a road access point. The transporter can be transported quickly around the field gathering the bales and placing them along the road approach or placing them in clusters of 36 bales in two rows of 18 bales where the fifth wheel trailer can be driven to the cluster and loaded by the front end loader.
4. The transporter is very quick and easy to operate and is very safe. The rear bale stop can be fixed or hydraulically opened. The bale stop assists in properly loading the bales since they are located at the rear and cannot move too far backwardly and also traps them in the chamber so that they cannot fall out as the trailer is transported across the field.

BRIEF DESCRIPTION OF THE DRAWINGS

One embodiment of the invention will now be described in conjunction with the accompanying drawings in which:

FIG. 1 is an isometric view of a transporter according to the present invention.

FIG. 2 is a front elevational view of the transporter of FIG. 1.

FIG. 3 is a top plan view of the transporter of FIG. 2 showing the movable back-stop.

In the drawings like characters of reference indicate corresponding parts in the different figures.

DETAILED DESCRIPTION

A trailer generally indicated at 10 includes a frame 11 having a longitudinal main beam 12 having a hitch 13 at a forward end. The frame includes longitudinal beams 15 and cross beams 16, 17, and 18. Ground wheels 20 are mounted on the frame so as to support the frame. The ends 21 of the transverse beams define the sides of the frame. On each side of the frame is mounted a cradle 30 which is formed of 3 generally annular surrounding members 31, 32 and 33 and a plurality of longitudinal rails 34 through 40. The rails 34 and 40 are arranged at the bottom of the cradle as shown in FIG. 2 and define a space 41 therebetween. Each of the rails 34 and 40 has an outwardly inclined portion 34A, 40A at its forward end. Thus in the outward extended position shown in FIG. 2, the cradle extends outwardly from the side of the frame with the rails 34 and 40 closely adjacent the ground and arranged to be spaced each on a respective side of a central axis 45 of a bale to be lifted. The forwardly and outwardly inclined portions 34A and 40A are arranged so that when the cradle is moved forwardly and there is slight misalignment between the rails and the bale, the bale is abutted firstly by the incline portions which can therefore tend to slightly adjust the position of the bale relative to the cradle.

The annular members are formed each as a roll-formed annular hoop broken at the bottom to form the opening or space 41. The rails 34 and 40 are arranged at the ends of the hoops respectively. The rails 35 to 39 are arranged at equidistant angular spacing around the hoops.

The an inner portion of each hoop in the extended position of the cradle is substantially vertical and extends outwardly from the outer edge 21 of the frame. The inner portion is welded to a bracket 60 which is pivotally mounted on a pin 61 carried at the side of the frame on the end of a respective one of the beams 16, 17 and 18. The brackets are each pivotal on the respective pin 61 and is operable by a cylinder 62 attached at a pin 63 to the bracket 60 and extendable from a clevis 64 on the underside of the respective cross member of the frame. Thus the cradle can be pivoted about the pin 61 from the extended position shown in FIG. 2 to the transfer position shown in FIG. 1. In the extended position shown in FIG. 2, the inner portion is vertical and spaced slightly outwardly from the end 21 of the respective cross member. In the transport position shown in FIG. 1, the inner portion is moved inwardly and the location of the pivot pin 61 is such that the inner portion has a leg 51 which sits on top of the respective cross member in the transport position.

This rotation causes the bale also to rotate. The fact that the cradle defines a tubular member or cylindrical member slightly larger in diameter than the bale means that the bale remains in the same orientation within the cradle as the cradle is rotated and simply flops onto the supporting rails 39, 39A, 39B, 38 and 37 in the transport position. When the cradle is rotated back to the extended position, the bale remains in its common orientation with the cradle so that it returns to its original position at the ground with the flat spot F at the ground.

In FIG. 3 is shown a backstop member 70 in the form of an arm which projects into the interior of the cradle so as to define a backstop plate 72 adjacent the axis of the bale for engaging the rear most bale to prevent the bales from sliding to far rearwardly and dropping from the rear of the cradle. The arm 70 is mounted on a pivot pin 73 carried at a rear end of the rail 37. The arm 70 is pivoted through 90 degrees by a cylinder 75 pulling on a lever 76 which retracts the arm to a retracted position. Thus the cylinder 75 can be actuated to release the bales from the backstop to allow the bale to slide rearwardly.

In operation, the trailer is towed across a field having bales to be transported with the cradles in the extended position. The first cradle on one side is brought up to the rear of a bale so that the rails 34 and 40 slide each on the respective side of the bale to a position where the bale is enclosed within the cradle. The cradle is then lifted slightly by a distance of a few inches so as to lift the bale from the ground to prevent inadvertent engagement with obstacles on the ground and to prevent the bale from being damaged by pulling over the ground or by pulling away the strings holding the bale in place. The bale is then carried to the next bale in the field and preferably the next bale is loaded on the opposite side in the cradle on that side while the first cradle remains slightly lifted. The bale is then again loading by sliding the cradle underneath the bale until the bale can be lifted from the ground. Normally the bales are loaded at the front of the cradle and then the trailer is brought up to a next bale which acts to push the first bale rearwardly within the cradle up to the second position. In this way a number of bales depending upon the cradles can be loaded on the transporter with some on each side whereupon the cradle can be rotated to the transport position on top of the support area of the frame for transport across the field over a longer distance to the unloading location depending upon the dimensions, preferably three or four bales can be loaded on each side. At the unloading location the backstop can be opened and the trailer moved forwardly to deposit the bales onto the ground. Where bales are already existing in the line, additional bales are applied onto the rear of the line simple by driving the tractor through between the two lines which acts to push the bales out of the cradle and allows the bottom rails of the cradle to slide along the ground along the existing lines of bales until the transport emerges from the front of the lines and can return to the field to collect more bails.

Alternatively when using a fixed backstop or when preferred, the backstop can be left closed and the bales discharged by moving in the reverse direction. This has the advantaged that there is less possibility of catching a string of an existing bale in the line which can damage the bale beyond repair.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. Apparatus for transporting round bales comprising:
   a transporter frame mounted on ground wheels for movement across the ground;
   the frame having two sides defining therebetween a support area;
   two bale support cradles, each mounted at a respective one of the sides;
   each support cradle being pivotal about an axis along the respective side between a first lifting position in which the cradle extends outwardly from the respective side and a second transport position in which the cradle is located on the support area for transport on the frame;
   each cradle having bale support surfaces defining a cylindrical chamber within which a plurality of bales can be supported coaxially end to end with the axes of the bales extending longitudinally along the cradle;
   the support surfaces being arranged such that a bale in the chamber is lifted and rotated, by movement of the cradle from the first position to the second position, from a position alongside the frame at an initial angular orientation relative to the ground to a transport position on the frame and is returned to the position alongside the frame at the same initial orientation relative to the ground, by movement of the cradle from the second position to the first position;
   each cradle having two bale lifting surfaces extending longitudinally along the cradle and transversely spaced across the cradle;
   the bale lifting surfaces being arranged so that during foward longitudinal movement of the cradle in a direction axially of a bale resting on the ground the bale lifting surfaces move axially of the bale to a position where each lies on a respective side of a center line of the bale;
   the bale lifting surfaces being arranged and spaced by a distance less than the diameter of the bale such that the bale lifting surfaces extend underneath that part of the bale which is spaced from the ground for lifting the bale from the ground and returning the bale to the ground.

2. The apparatus according to claim 1 wherein the bale lifting surfaces comprise a pair of parallel rails with outwardly diverging front end portions.

3. The apparatus according to claim 1 wherein each cradle is arranged to support at least three bales.

4. The apparatus according to claim 1 wherein the bale support surfaces comprise a plurality of parallel rails supported at the surface of an imaginary cylinder surrounding the bale by a plurality of generally annular members at spaced positions along the cradle.

5. The apparatus according to claim 4 wherein each annular member comprises a roll-formed hoop.

6. The apparatus according to claim 4 wherein an inner part of the annular members include a leg member so as to rest on the frame when moved to the transport position.

7. The apparatus according to claim 4 wherein an inner part of the annular members are pivotally connected to the frame side by a bracket defining a pivot axis inwardly of the inner part and located along the frame side.

8. The apparatus according to claim 7 wherein the bracket is pivotal by a hydraulic cylinder connected to the bracket underneath the frame.

9. Apparatus for transporting round bales comprising:

a transporter frame mounted on ground wheels for movement across the ground;

the frame having two sides defining therebetween a support area;

two bale support cradles, each mounted at a respective one of the sides;

each support cradle being pivotal about an axis along the respective side between a first lifting position in which the cradle extends outwardly from the respective side and a second transport position in which the cradle is located on the support area for transport on the frame;

each cradle having bale support surfaces defining a cylindrical chamber within which a plurality of bales can be supported coaxially end to end with the axes of the bales extending longitudinally along the cradle;

the support surfaces being arranged such that a bale in the chamber is lifted and rotated, by movement of the cradle from the first position to the second position, from a position alongside the frame at an initial angular orientation relative to the ground to a transport position on the frame and is returned to the position alongside the frame at the same initial orientation relative to the ground, by movement of the cradle from the second position to the first position;

each cradle having two bale lifting surfaces extending longitudinally along the cradle and transversely spaced across the cradle;

the bale lifting surfaces being arranged so that during forward longitudinal movement of the cradle in a direction axially of a bale resting on the ground the bale lifting surfaces move axially of the bale to a position where each lies on a respective side of a center line of the bale;

the bale lifting surfaces being arranged and spaced by a distance less than the diameter of the bale such that the bale lifting surfaces extend underneath that part of the bale which is spaced from the ground for lifting the bale from the ground and returning the bale to the ground;

wherein each cradle is open at its front and rear ends so as to allow a bale to be moved through its front end and discharged from its rear end by forward movement of the frame;

and wherein each cradle has a stop member for preventing rearward movement of a bale beyond a rear end of the cradle.

10. The apparatus according to claim 9 wherein the stop member is movable from an operating position closing the rear end to a retracted position in which the rear end is open allowing the bale to be discharged from the rear end.

11. The apparatus according to claim 9 wherein the bale lifting surfaces comprise a pair of parallel rails with outwardly diverging front end portions.

12. The apparatus according to claim 9 wherein each cradle is arranged to support at least three bales.

13. The apparatus according to claim 9 wherein the bale support surfaces comprise a plurality of parallel rails supported at the surface of an imaginary cylinder surrounding the bale by a plurality of generally annular members at spaced positions along the cradle.

14. The apparatus according to claim 13 wherein each annular member comprises a roll-formed hoop.

15. The apparatus according to claim 13 wherein an inner part of the annular members include a leg member so as to rest on the frame when moved to the transport position.

16. The apparatus according to claim 13 wherein an inner part of the annular members are pivotally connected to the frame side by a bracket defining a pivot axis inwardly of the inner part and located along the frame side.

17. The apparatus according to claim 16 wherein the bracket is pivotal by a hydraulic cylinder connected to the bracket underneath the frame.

* * * * *